United States Patent
Ruth et al.

(10) Patent No.: US 11,512,501 B2
(45) Date of Patent: *Nov. 29, 2022

(54) SYSTEMS AND METHODS OF SECURING TRANSPORT CONTAINERS TO ATTACHMENT POINTS

(71) Applicant: MOTOGO, LLC, Austin, TX (US)

(72) Inventors: David Brian Ruth, Austin, TX (US); Yuan-Chang Lo, Austin, TX (US)

(73) Assignee: Motogo, LLC, Austin, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/038,313

(22) Filed: Sep. 30, 2020

(65) Prior Publication Data
US 2021/0025199 A1    Jan. 28, 2021

Related U.S. Application Data

(63) Continuation of application No. 16/247,448, filed on Jan. 14, 2019, now Pat. No. 10,829,962.

(60) Provisional application No. 62/617,480, filed on Jan. 15, 2018.

(51) Int. Cl.
| | | |
|---|---|---|
| *E05B 73/00* | (2006.01) | |
| *B60P 7/08* | (2006.01) | |
| *F16M 13/02* | (2006.01) | |
| *A47G 29/14* | (2006.01) | |
| *E05B 47/00* | (2006.01) | |

(52) U.S. Cl.
CPC .......... *E05B 73/00* (2013.01); *A47G 29/141* (2013.01); *B60P 7/0807* (2013.01); *E05B 47/0002* (2013.01); *F16M 13/02* (2013.01); *A47G 2029/144* (2013.01); *A47G 2029/146* (2013.01); *A47G 2029/149* (2013.01); *E05Y 2900/602* (2013.01); *F16M 2200/02* (2013.01)

(58) Field of Classification Search
CPC .... Y10T 292/11; E05B 73/00; E05B 47/0002; A47G 29/141
USPC .......... 220/223, 230; 70/276; 206/719, 818; 248/683, 689, 550, 206.5, 229.1, 551, 248/213.2, 229.13, 229.14, 229.2, 229.23, 248/229.24, 228.4, 228.5, 230.4, 230.5, 248/231.51, 231.61, 309.4, 311.2, 907

See application file for complete search history.

(56) References Cited

U.S. PATENT DOCUMENTS

| | | |
|---|---|---|
| 3,611,136 A | 10/1971 | Ito et al. |
| 3,858,280 A | 1/1975 | Martens |
| 4,613,271 A | 9/1986 | Naab |
| 5,104,950 A | 4/1992 | Martin et al. |
| 5,337,459 A | 8/1994 | Hogan |
| 5,367,278 A | 11/1994 | Koshikawa |
| 5,451,131 A | 9/1995 | Hecht et al. |

(Continued)

FOREIGN PATENT DOCUMENTS

EP    3002738 A1 * 4/2016 ............. A47G 29/00

*Primary Examiner* — Terrell L McKinnon
*Assistant Examiner* — Michael McDuffie
(74) *Attorney, Agent, or Firm* — Moore Intellectual Property Law, PLLC

(57) ABSTRACT

Securing systems and methods of securing a transport container to an attachment point. In one embodiment, the securing system includes an actuator, an attachment structure, and an electronic controller. The attachment structure is dimensioned to complement the actuator. The electronic controller is operably coupled to the actuator for attaching and releasing the actuator to the attachment structure.

20 Claims, 16 Drawing Sheets

(56) References Cited

U.S. PATENT DOCUMENTS

| | | |
|---|---|---|
| 6,336,567 B1 | 1/2002 | Hyobu |
| 9,842,449 B1 | 12/2017 | Ruth |
| 10,016,065 B1 | 7/2018 | Vaishnav |
| 10,275,966 B1 * | 4/2019 | Ruth .................. G07C 9/00896 |
| 10,829,962 B2 * | 11/2020 | Ruth .................. E05B 47/0002 |
| 2004/0178200 A1 | 9/2004 | Langlois et al. |
| 2005/0194384 A1 | 9/2005 | Petit |
| 2007/0222229 A1 | 9/2007 | Jasper |
| 2009/0121466 A1 | 5/2009 | Norum et al. |
| 2009/0205381 A1 | 8/2009 | Ho |
| 2012/0185093 A1 | 7/2012 | Kossett et al. |
| 2013/0247625 A1 | 9/2013 | Geng et al. |
| 2014/0034645 A1 | 2/2014 | Jackson |
| 2014/0138378 A1 | 5/2014 | Lequeux |
| 2014/0208813 A1 | 7/2014 | Reeb |
| 2015/0208826 A1 | 7/2015 | Yang et al. |
| 2015/0305518 A1 | 10/2015 | Galant |
| 2016/0001932 A1 | 1/2016 | Chourreau et al. |
| 2016/0356057 A1 | 12/2016 | Lin et al. |
| 2017/0107741 A1 | 4/2017 | Gillespie |
| 2018/0279805 A1 | 10/2018 | Galant |

* cited by examiner

SYSTEMS AND METHODS OF SECURING TRANSPORT CONTAINERS TO ATTACHMENT POINTS

CROSS-REFERENCE TO RELATED APPLICATION

The present application claims priority from and is a continuation application of U.S. patent application Ser. No. 16/247,448, filed Jan. 14, 2019 and entitled "SYSTEMS AND METHODS OF SECURING TRANSPORT CONTAINERS TO ATTACHMENT POINTS," which claims priority from U.S. Provisional Patent Application No. 62/617,480, filed Jan. 15, 2018, entitled "SYSTEMS AND METHODS OF SECURING TRANSPORT CONTAINERS TO ATTACHMENT POINTS," the contents of each of which are incorporated herein by reference in their entirety.

BACKGROUND

In recent years, consumers have been purchasing more products on-line. Items purchased on-line are often delivered directly to consumers at their residence. When a package is delivered and no one is present to receive it, the package is exposed and vulnerable to theft and tampering. Package delivery solutions include placing packages within electronic lockers and having recipients retrieve them by inputting a code. These solutions are practical in apartment and condo buildings. However, it is impractical, undesirable, and prohibitively expensive to install electronic lockers for residential homes.

Further, packages are vulnerable to theft and tampering while in transit. Package delivery solutions include placing packages in secure areas that only authorized personnel should be able to access. For example, while in transit, packages are placed in secure sorting warehouses and secure transportation vehicles. However, a large number of personnel have access to these secure areas. In addition, transport vehicles are often left unattended while the driver is delivering packages.

SUMMARY

There is a need for modular securing systems for attaching transport containers to attachment points that can easily be adapted for different types of transport containers as well as different types of fixed and non-fixed attachment points. There is also a need for methods of securing a transport container to an attachment point that ensure the transport container is attached to the correct attachment point as well as determine and report whether or not the attachment is successful.

Thus, the disclosure provides a securing system. In one embodiment, the securing system includes an actuator, an attachment structure, and an electronic controller. The attachment structure is dimensioned to complement the actuator. The electronic controller is operably coupled to the actuator for attaching and releasing the actuator to the attachment structure.

The disclosure also provides a method of securing a transport container to an attachment point. In one embodiment, the method includes receiving, via a transceiver included in an electronic controller, a request to attach the transport container to the attachment point. The method also includes authenticating the attachment point with an electronic processor included in the electronic controller. The method further includes activating, with the electronic processor, an actuator of the transport container to attach the actuator to an attachment structure of the attachment point. The method also transmitting, via the transceiver, a status signal indicating an attachment status of the transport container.

The disclosure further provides a securing system. In one embodiment, the securing system includes an actuator and an electronic controller. The actuator is configured for attachment to attachment structures. The electronic controller is operably coupled to the actuator for attaching and releasing the actuator to the attachment structure.

Other aspects of the disclosure will become apparent by consideration of the detailed description and accompanying drawings.

DETAILED DESCRIPTION

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components.

Figure 1A:
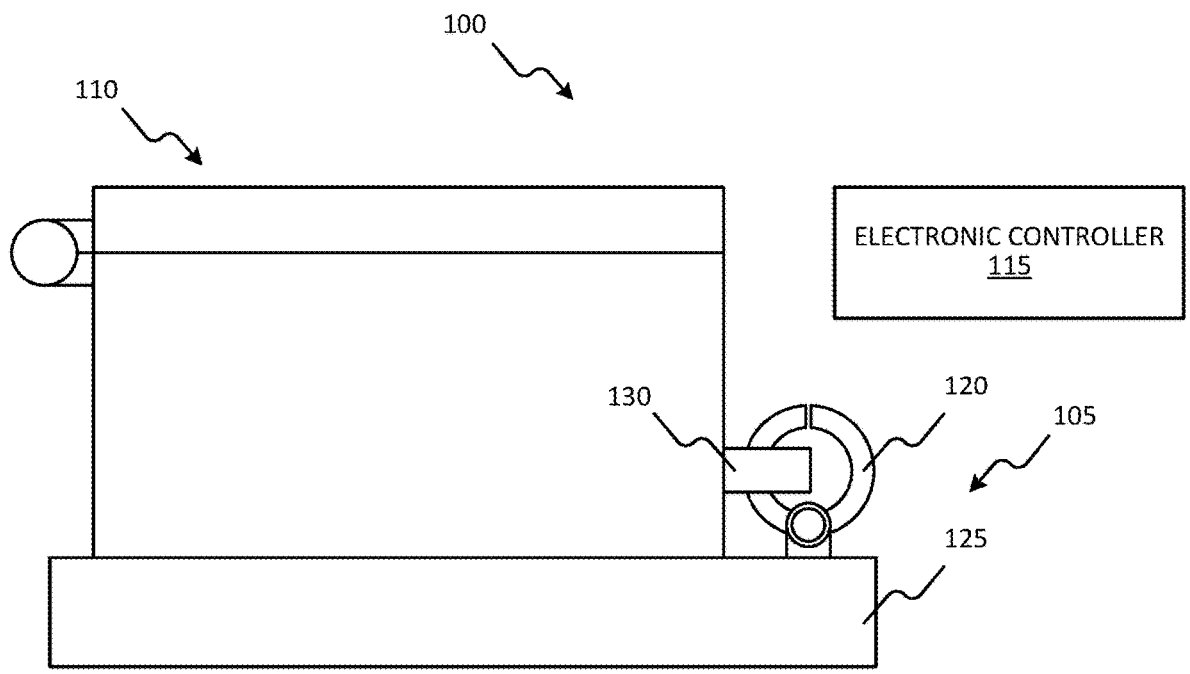
FIG. 1A is a front view of a securing system including an attachment point having an actuator and a transport container having an attachment structure, in accordance with some embodiments.
Figure 1B:
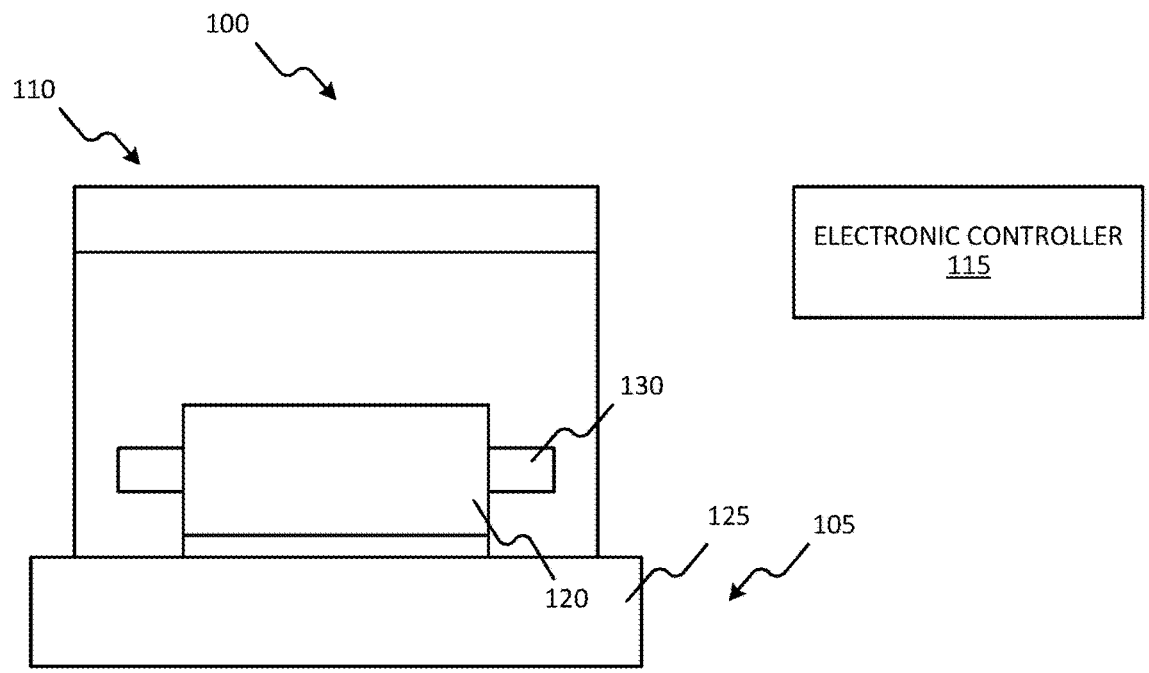
FIG. 1B is a side view of the attachment point and the transport container included in FIG. 1A.

FIGS. 1A and 1B are views of one example embodiment of a securing system 100. In the embodiment illustrated in FIGS. 1A and 1B, the securing system 100 includes an attachment point 105, a transport container 110, and an electronic controller 115. The attachment point 105 illustrated in FIGS. 1A and 1B includes an actuator 120 and a platform 125. The transport container 110 is illustrated in FIGS. 1A and 1B as a box including a body and a cover (or lid) pivotally coupled to the body. In some embodiments, the transport container 110 can include a transport container similar to those described in U.S. patent application Ser. No. 15/498,012, entitled "SECURE TRANSPORT CONTAINER," filed Apr. 26, 2017, the entire contents of which are incorporated herein by reference. The transport container 110 illustrated in FIGS. 1A and 1B includes an attachment structure 130. The attachment structure 130 of the transport container 110 is dimensioned to complement the actuator 120 of the attachment point 105. The actuator 120 and the attachment structure 130 together provide a secure method of attaching the transport container 110 to the attachment point 105.

In some embodiments, the attachment point 105 is anchored to a fixed structure that is associated with a physical location. For example, the attachment point 105 may be anchored to the ground outside of a residence or a business. Alternatively or in addition, the attachment point 105 is anchored to a vehicle. For example, the attachment point 105 may be anchored to a car, a truck, a train, an airplane, or a drone.

Figure 2A:
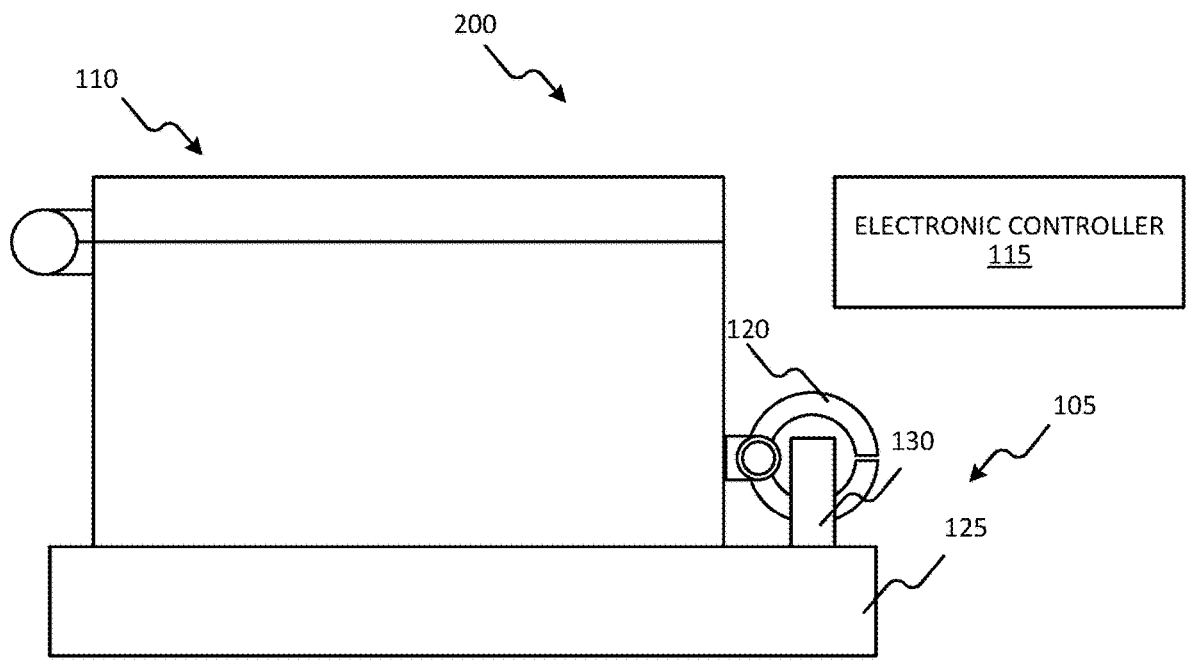
FIG. 2A is a front view of a securing system including an attachment point having an attachment structure and a transport container having an actuator, in accordance with some embodiments.
Figure 2B:
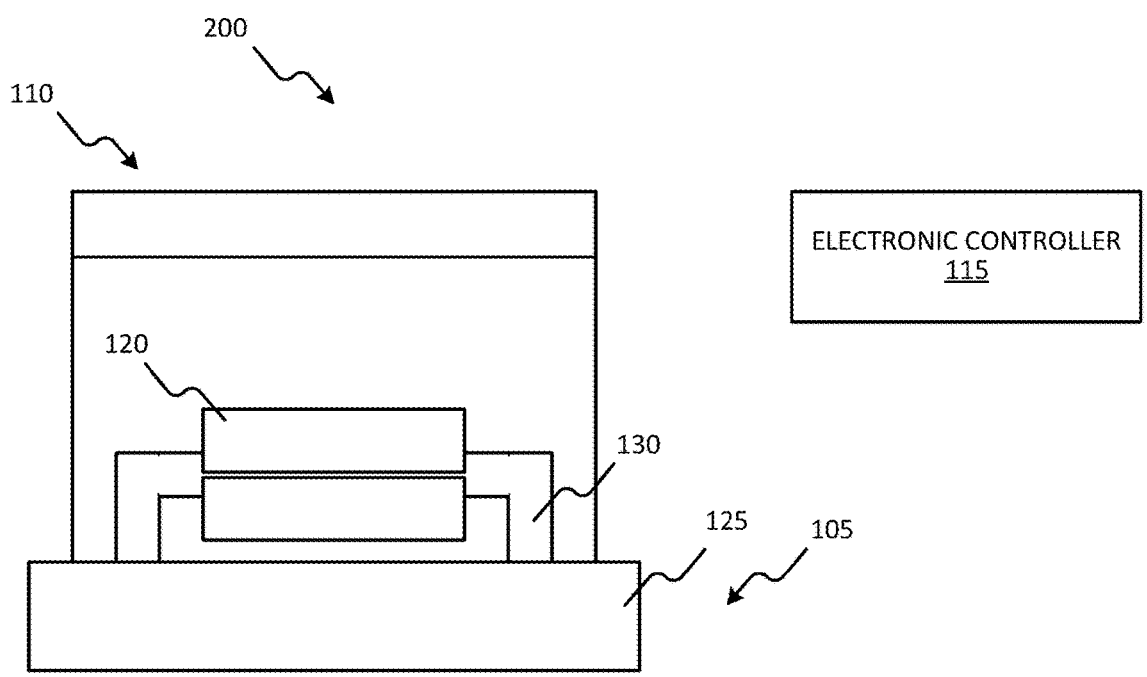
FIG. 2B is a side view of the attachment point and the transport container included in FIG. 2A.

The securing system 100 illustrated in FIGS. 1A and 1B is provided as one example of such a system. The methods described herein may be used with securing systems with fewer, additional, or different components in different configurations than the securing system 100 illustrated in FIGS. 1A and 1B. For example, FIGS. 2A and 2B are diagrams of one example embodiment of a securing system 200 in which the attachment point 105 includes the attachment structure 130 and the transport container 110 includes the actuator 120.

Figure 3:
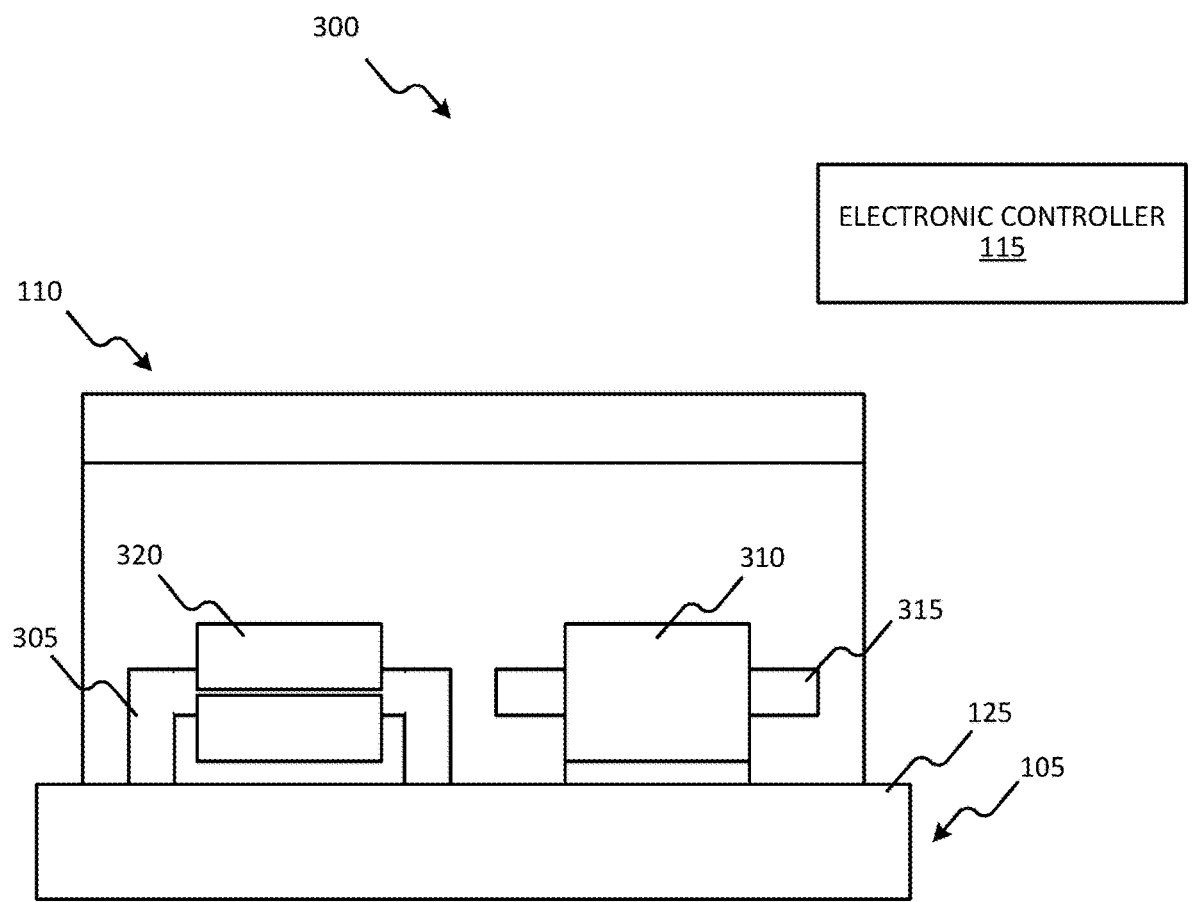
FIG. 3 is a side view of a securing system including an attachment point and a transport container that each include an actuator and an attachment structure, in accordance with some embodiments.

As a further example, FIG. 3 is a diagram of one example embodiment of a securing system 300 in which the attachment point 105 and the transport container 110 both include actuators and locking structures to provide two-way securing. In FIG. 3, the attachment point 105 includes an attachment structure 305 and an actuator 310, and the transport container 110 includes an attachment structure 315 and an actuator 320. The attachment structure 305 of the attachment point 105 is dimensioned to complement the actuator 320 of the transport container 110. The attachment structure 315 of the transport container 110 is dimensioned to complement the actuator 310 of the attachment point 105. In some embodiments, one end of the transport container 110 may attach to a delivery vehicle and another end may attach to a fixed structure, such as during a delivery handoff procedure.

The actuator 120 and attachment structure 130 are illustrated in FIGS. 1A, 1B, 2A, and 2B as a locking clamp and a bar, respectively. The actuator 120 and the attachment structure 130 can include any appropriate form of complementary locking structures (for example, hooks, levers, etc.). In addition, in some embodiments, the actuator 120 and the attachment structure 130 can include threaded fasteners, pistons, or electromagnets.

Figure 4A:
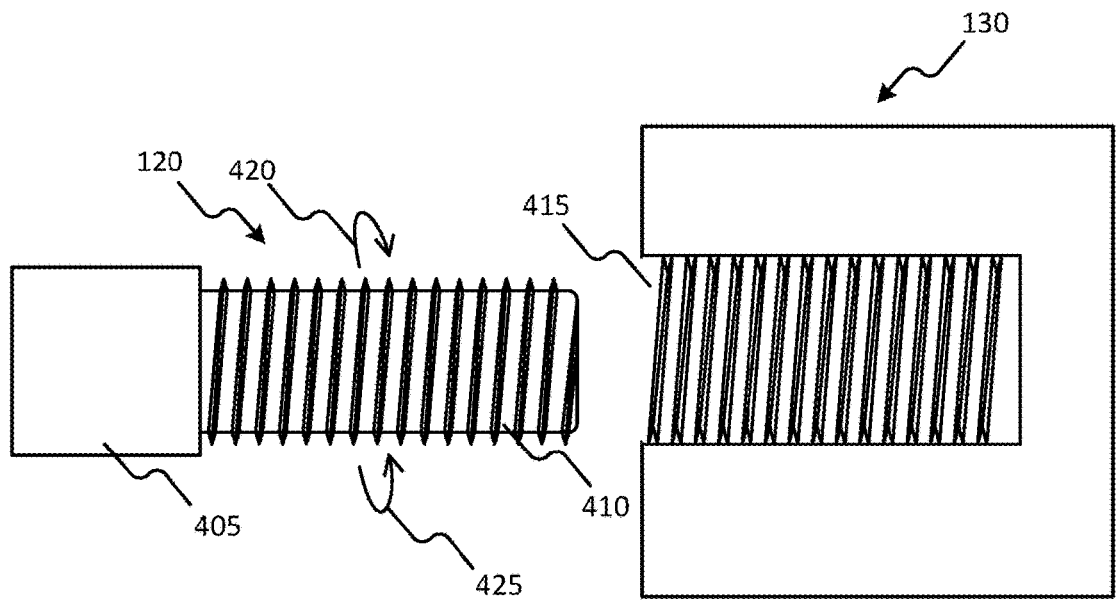
FIGS. 4A and 4B are partial sectional views of a threaded-type actuator and an attachment structure, in accordance with some embodiments.
Figure 4B:
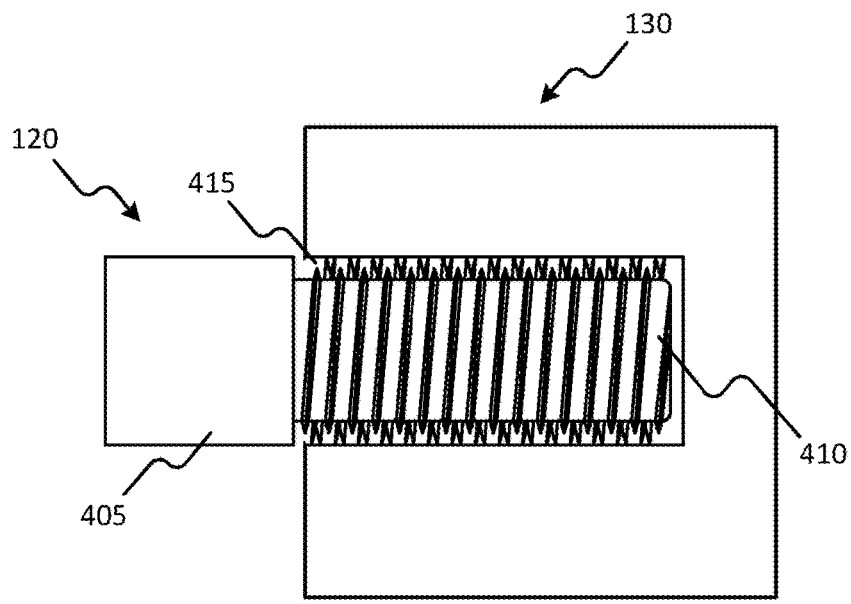

FIGS. 4A and 4B illustrate one example embodiment of a threaded locking structure. The actuator 120 illustrated in FIGS. 4A and 4B includes a motor 405 and a threaded fastener 410 having external threads (for example, a screw, a bolt, or a stud). The motor 405 is operably coupled to the threaded fastener 410 such that the motor 405 can rotate the threaded fastener 410 in clockwise and counter-clockwise directions. The attachment structure 130 illustrated in FIGS. 4A and 4B includes a threaded sleeve 415 with internal threads. In FIG. 4A, the actuator 120 is released from the attachment structure 130. In FIG. 4B, the actuator 120 is attached to the attachment structure 130. To attach the actuator 120 to the attachment structure 130, the motor 405 rotates the threaded fastener 410 in the direction of arrow 420 such that the threaded fastener 410 moves into the threaded sleeve 415. To release the actuator 120 from the attachment structure 130, the motor 405 rotates the threaded fastener 410 in the direction of arrow 425 (opposite from the direction of arrow 420) such that the threaded fastener 410 moves out of the threaded sleeve 415.

Figure 5A:
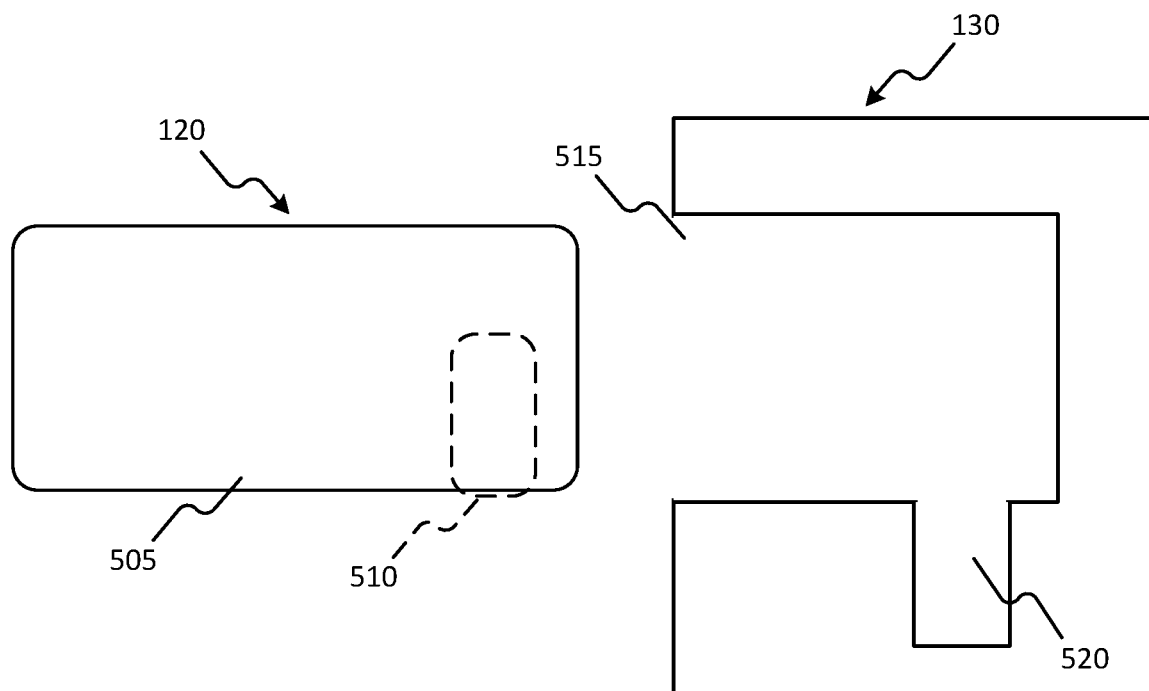
FIGS. 5A and 5B are partial sectional views of a piston-type actuator and an attachment structure, in accordance with some embodiments.
Figure 5B:
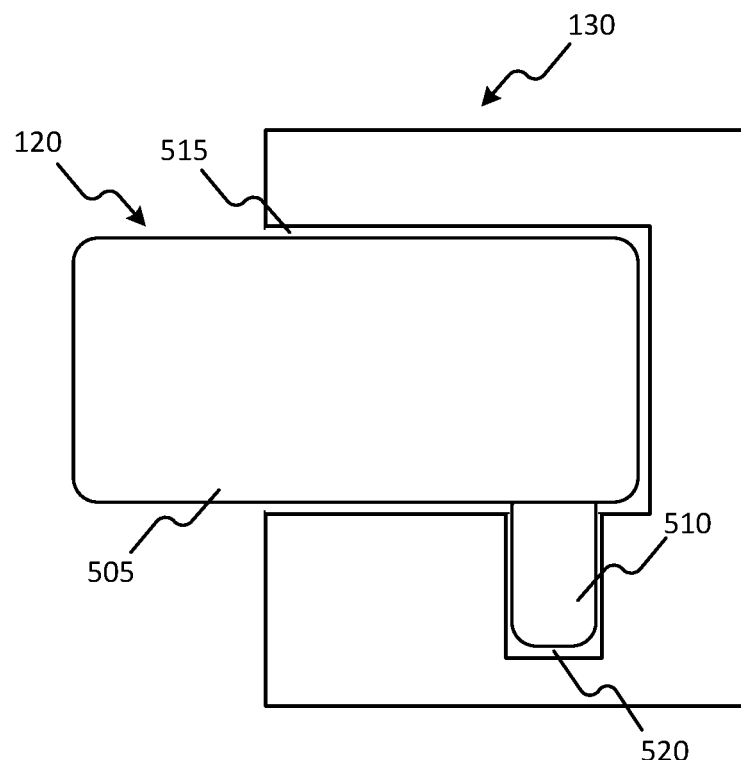

FIGS. 5A and 5B illustrate one example embodiment of a piston locking structure. The actuator 120 illustrated in FIGS. 5A and 5B includes a body 505 and a piston 510. The attachment structure 130 illustrated in FIGS. 5A and 5B includes a sleeve 515 having an expansion space 520. The actuator 120 is configured to move the piston 510 in and out of the body 505 (for example, electrical or hydraulically). In FIG. 5A, the actuator 120 is released from the attachment structure 130. In FIG. 5A, the actuator 120 is an unlocked state in which that piston 510 is positioned substantially with the body 505. In FIG. 5B, the actuator 120 is attached to the attachment structure 130. In FIG. 5B, the actuator 120 is in a locked stated in which the piston 510 is positioned such that it substantially extends out of the body 505 and into the expansion space 520 of the attachment structure 130. To attach the actuator 120 to the attachment structure 130, the body 505 is inserted into the sleeve 515 and the piston 510 expands into the expansion space 520, as illustrated in FIG. 5B. To release the actuator 120 from the attachment structure 130, the piston 510 is retracted into the body 505 such that the body 505 can be removed from the sleeve 515.

Figure 6A:
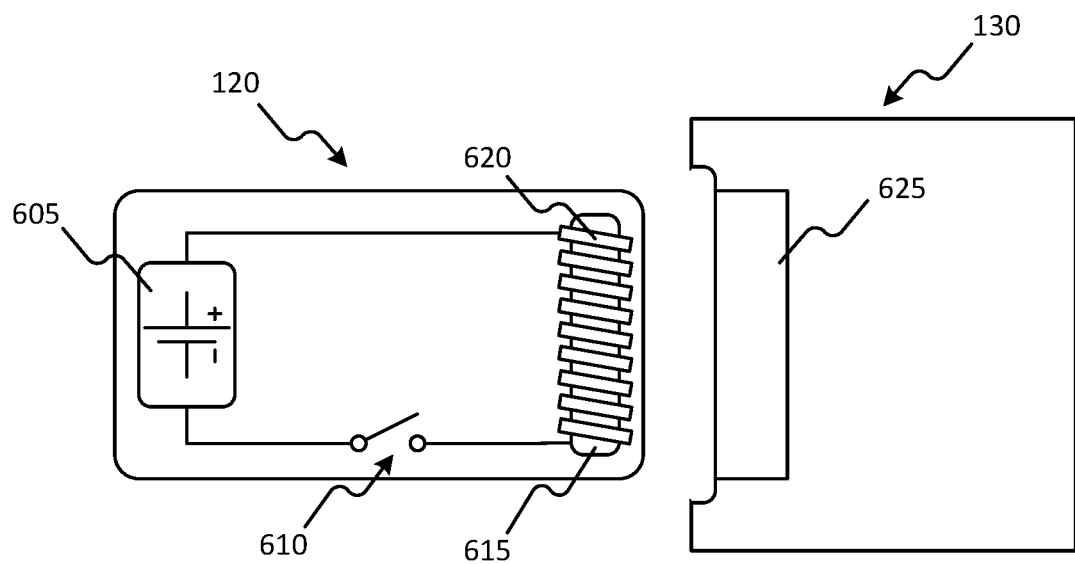
FIGS. 6A and 6B are partial sectional views of an electromagnet-type actuator and an attachment structure, in accordance with some embodiments.
Figure 6B:
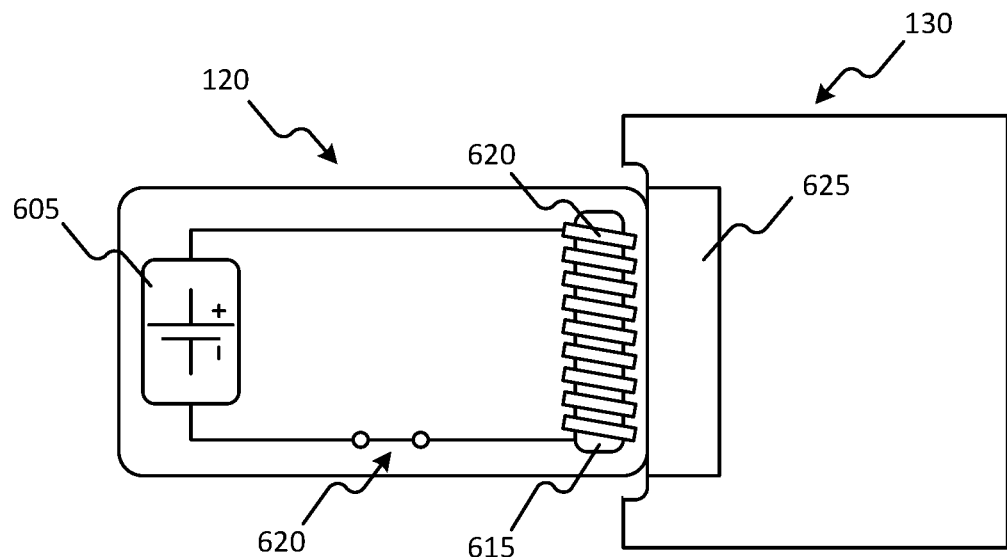

FIGS. 6A and 6B illustrate one example embodiment of an electromagnetic locking structure. The actuator 120 illustrated in FIGS. 6A and 6B has an electromagnet including a power source 605 (for example, a battery), a switch 610, an iron core 615, and a coil of insulated wire 620. The attachment structure 130 illustrated in FIGS. 6A and 6B includes a metal plate 625. When the switch 610 is in a closed state, electric current supplied by the power source 605 flows through the coil of insulated wire 620 around the iron core 615 which generates a magnetic field. In FIG. 6A, the actuator 120 is released from the attachment structure 130. In FIG. 6A, the switch 610 is an open state and a magnetic field is not generated. In FIG. 6B, the actuator 120 is attached to the attachment structure 130. In FIG. 6B, the switch 610 is a closed state and the actuator 120 generates a magnetic field. The magnetic field generated by the actuator 120 attracts the metal plate 625 of the attachment structure 130 such that the actuator 120 is securely attached to the attachment structure 130.

Figure 7:
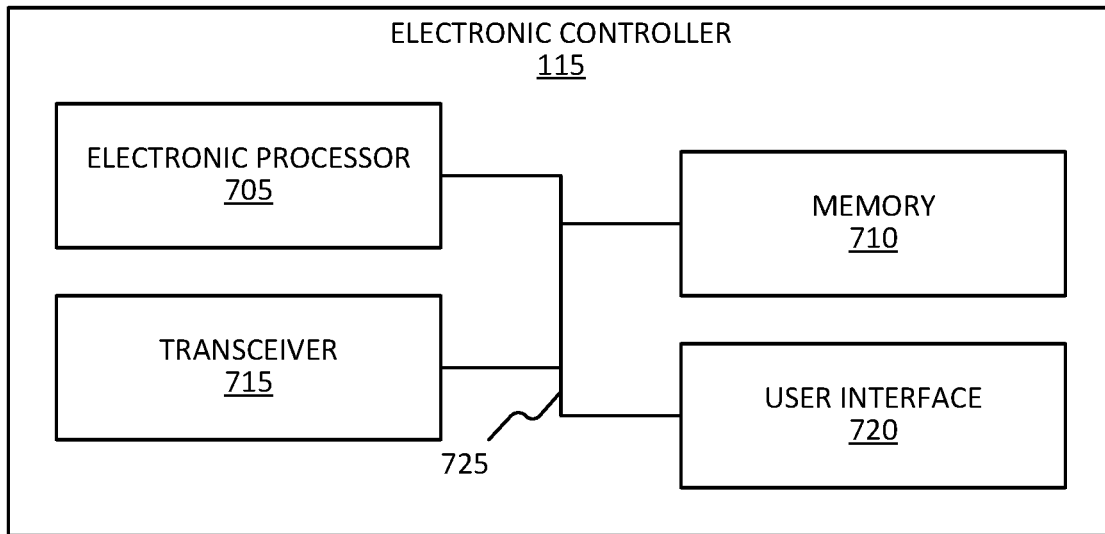
FIG. 7 is a block diagram of an electronic controller included in the securing systems of FIGS. 1A, 1B, 2A, 2B, and 3, in accordance with some embodiments.

FIG. 7 is a diagram of one example embodiment of the components included in the electronic controller 115. The electronic controller 115 illustrated in FIG. 7 includes an electronic processor 705 (for example, a microprocessor), memory 710, a transceiver 715, and a user interface 720. The electronic processor 705, the memory 710, as well as the other various modules are coupled by a bus 725, or are coupled directly, by one or more additional control or data buses, or a combination thereof. In alternate embodiments, the electronic controller 115 may include fewer or additional components in configurations different from the configuration illustrated in FIG. 7.

The memory 710 includes read only memory (ROM), random access memory (RAM), an electrically erasable programmable read-only memory (EEPROM), other non-transitory computer-readable media, or any combination thereof. The electronic processor 705 is configured to retrieve program instructions and data from the memory 710 and execute, among other things, instructions to perform the methods described herein. Additionally or alternatively, the memory 710 is included in the electronic processor 705.

The transceiver 715 is configured to provide communications between components of the attachment point 105 and components of the transport container 110 or other components within the securing system 100 (for example, delivery vehicles, sorting facilities, etc.). The transceiver 715 transmits signals to one or more communication networks and receives signals from the communication networks. In some embodiments, signals include, for example, data, data packets, attachment requests, attachment statuses, control signals, identification signals, or any combination thereof. In some embodiments, the transceiver 715 includes separate transmitters and receivers. The communication network may be implemented using various networks, for example, a cellular network, the Internet, a Bluetooth™ network, a wireless local area network (for example, Wi-Fi), a wireless accessory Personal Area Network (PAN), cable, an Ethernet network, satellite, a machine-to-machine (M2M) autonomous network, and a public switched telephone network.

The user interface 720 can include any combination of digital and analog input devices required to achieve a desired level of control for the electronic controller 115. For example, the user interface 720 can include a display, a camera, a speaker, a plurality of knobs, dials, switches, buttons, and the like. In some embodiments, the user interface 720 includes a touch-sensitive interface (for example, touch-screen display) that displays visual output generated by software applications executed by the electronic processor 705. Visual output includes, for example, graphical indicators, lights, colors, text, images, graphical user interfaces (GUIs), combinations of the foregoing, and the like. The touch-sensitive interface includes a suitable display mechanism for displaying the visual output (for example, a light-emitting diode (LED) screen, a liquid crystal display (LCD) screen, and the like). The touch-sensitive interface also receives user input using detected physical contact (for example, detected capacitance or resistance). Based on the user input, the touch-sensitive interface outputs signals to the electronic processor 705 indicate positions on the touch-sensitive interface currently being selected by physical contact.

In some embodiments, the electronic controller 115 is operably coupled (for example, via the transceiver 715) to the attachment point 105 for attaching and releasing the actuator 120 to the attachment structure 130. Alternatively or in addition, the electronic controller 115 is operably coupled (for example, via the transceiver 715) to the transport container 110 for attaching and releasing the actuator 120 to the attachment structure 130. The electronic controller 115 is illustrated in FIGS. 1A, 1B, 2A, 2B, and 3 as being separate from the attachment point 105 and the transport container 110. In some embodiments, a portion of the electronic controller 115 is located remotely from the attachment point 105 and the transport container 110. For example, a portion of the electronic controller 115 is located at a central control facility. Functions used by the electronic controller 115 that may be compute-intensive or may involve access to database (e.g., authentication, image processing, and/or voice analysis) may be performed at a remote central control facility, which may for example be a datacenter or cloud-hosted facility. Alternatively or in addition, the electronic controller 115 is included in the attachment point 105. Alternatively or in addition, the electronic controller 115 is included in the transport container 110. In some embodiments, the attachment point 105, the transport container 110, or both include all or a combination of the components included in the electronic controller 115. In some embodiments, the electronic controller 115, or components thereof, are implemented using a mobile computing device. To illustrate, an application executed on a mobile telephone or tablet computer may be operated to attach the actuator 120 to the attachment structure 130 and to release the actuator 120 from the attachment structure. The mobile device may also be leveraged to enable the package container or the attachment point to access the Internet (or other network) and hosted functions. The application may also display information regarding the transport container 110, items in the transport container 110, shipping/route status of the transport container 110, source/destination of the transport container 110, etc.

Figure 8:
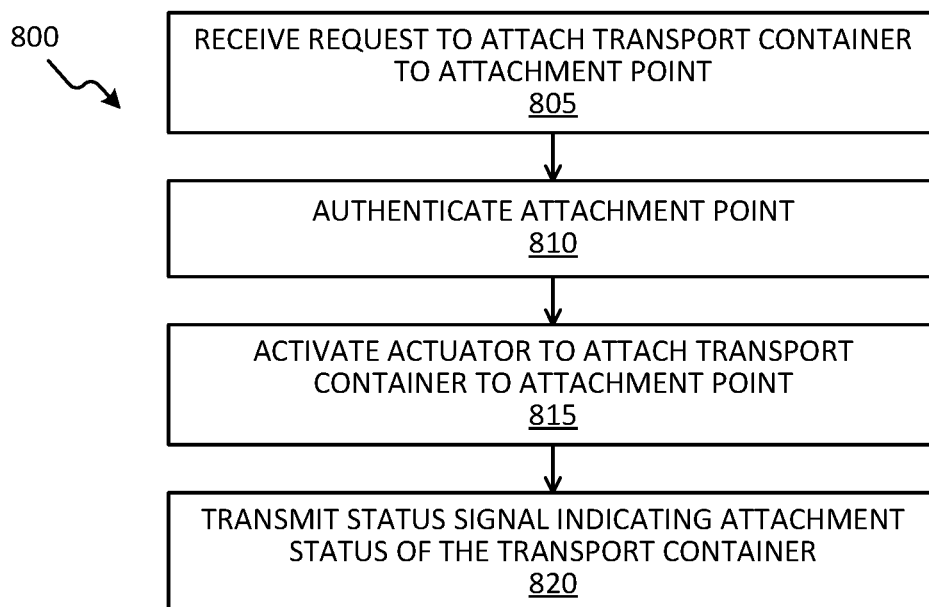
FIG. 8 is a flowchart of a method of securing a transport container to an attachment point, in accordance with some embodiments.

FIG. 8 illustrates an example method 800 of securing the transport container 110 to the attachment point 105. The steps (or blocks) of the method 800 are described in an iterative manner for descriptive purposes. Various steps (or blocks) described herein with respect to the method 800 are capable of being executed simultaneously, in parallel, or in an order that differs from the illustrated serial and iterative manner of execution. In the example illustrated, the method 800 includes the electronic controller 115 receiving a request (for example, via the transceiver 715) to attach the transport container 110 to the attachment point 105 (at block 805). In some embodiments, the request includes identification information of the attachment point 105. Identification information can include, among other things, identifiers (for example, alphanumeric identifiers), location type (for example, fixed location or non-fixed location), physical attributes (for example, dimensions, type and quantity of actuators, and type and quantity of attachment structures), or a combination thereof.

Alternatively or in addition, the request includes location information of the attachment point 105. For an attachment point 105 that is anchored to a fixed structure (for example, a structure on the ground outside a residence, a structure in a storage facility, or a structure in a receiving room of a building), location information can include, among other things, a physical location of the attachment point 105 (for example, GPS coordinates), an address associated with the attachment point 105 (for example, a residential address, a building address, or a storage facility address), or both. For an attachment point 105 that is anchored to a vehicle (or other non-fixed structure), location information can include, among other things, a current physical location of the vehicle (for example, GPS coordinates, the closest address to the vehicle, or the name of the street or highway the vehicle is currently traveling on), an intended destination of the vehicle, a previous location of the vehicle, or a combination thereof.

Returning to FIG. 8, at block 810, the electronic controller 115 authenticates the attachment point 105 to ensure that the transport container 110 is being attached to the correct point.

In some embodiments, the electronic controller 115 authenticates the attachment point 105 and the transport container 110 based on signals transmitted between the attachment point 105 and the transport container 110. For example, the attachment point 105 can transmit (or broadcast) an identification signal. When positioned near the attachment point 105, the transport container 110 receives the identification signal. The electronic controller 115 compares the identification signal with a predetermined identification signal. In some embodiments, the electronic controller 115 sets the identification signal transmitted by the attachment point 105. In some embodiments, the identification signal transmitted by the attachment point 105 periodically changes. For example, the identification signal may change hourly, daily, weekly, or monthly. In such embodiments, the electronic controller 115 may compare an identification signal received by the transport container 110 with a predetermined identification signal that is only valid for the timeframe in which the transport container 110 received the identification signal from the attachment point 105. In some examples, if the attachment point 105 is not the correct attachment point for the transport container 110, the electronic controller 115 disables operation of the actuator 120 so that the transport container 110 is not erroneously attached to the mismatched attachment point 105. In some embodiments, authentication can use a challenge-response protocol to mitigate replay attacks.

Alternatively or in addition, the electronic controller 115 authenticates the attachment point 105 based on the locations of the attachment point 105, the transport container 110, or both. For example, in some embodiments, the electronic controller 115 determines and compares the location of the transport container 110 with the location of the attachment point 105 to ensure that the locations are the same (or are within a set proximity of each other).

At block 815, the electronic controller 115 activates the actuator 120 to attach the transport container 110 to the attachment point 105. For example, the electronic controller 115 sends a control signal which causes the actuator 120 to attach itself to the attachment structure 130. For clamp-type actuators, such as the ones illustrated in FIGS. 1A, 1B, 2A, 2B, and 3, activating the actuator 120 can include changing the actuator 120 from an unlocked state (or open state) to a locked state (or closed state) in which the actuator 120 is securely attached to the attachment structure 130. For threaded-type actuators, such as the one illustrated in FIGS. 4A and 4B, actuating the actuator 120 can include causing the actuator 120 to rotate such that it is secured within at least portion of the attachment structure 130. For piston-type actuators, such as the one illustrated in FIGS. 5A and 5B, actuating the actuator 120 can includes expanding a portion of the actuator 120 (for example, piston 510) into a space included in the attachment structure 130 (for example, expansion space 520). For magnetic-type actuators, such as the one illustrated in FIGS. 6A and 6B, activating the actuator 120 can includes causing the actuator 120 to generate a magnetic field (for example, by closing switch 610).

At block 820, the electronic controller 115 transmits a status signal (for example, via the transceiver 715) indicating an attachment status of the transport container 110. For example, the electronic controller 115 may transmit a signal indicating that the transport container 110 is securely attached to the attachment point 105. Alternatively or in addition, the electronic controller 115 may transmit a signal indicating that the transport container 110 is not securely attached to the attachment point 105. For example, the signal may indicate that actuator 120 was not successfully attached to the attachment structure 130. The status signal may be transmitted to, for example, a recipient of the transport container 110, a sender of the transport container 110, an owner of the transport container 110, an owner of the attachment point 105, or a combination thereof.

As described above in relation to block 810, the electronic controller 115 authenticates the attachment point 105. Alternatively or in addition, the electronic controller 115 authenticates the transport container 110. For example, the transport container 110 can transmit (or broadcast) an identification signal. When the transport container 110 is positioned near the attachment point 105, the attachment point 105 receives the identification signal. The electronic controller 115 compares the identification signal with a predetermined identification signal.

Figure 9:
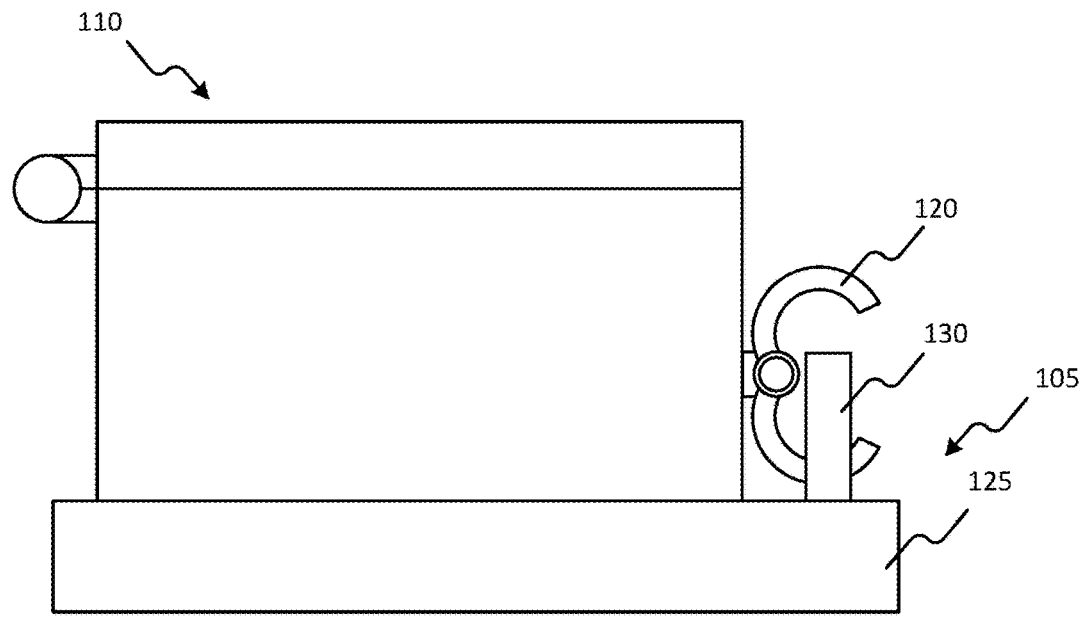
FIG. 9 is a side view of an actuator that is properly aligned with an attachment structure, in accordance with some embodiments.
Figure 10:
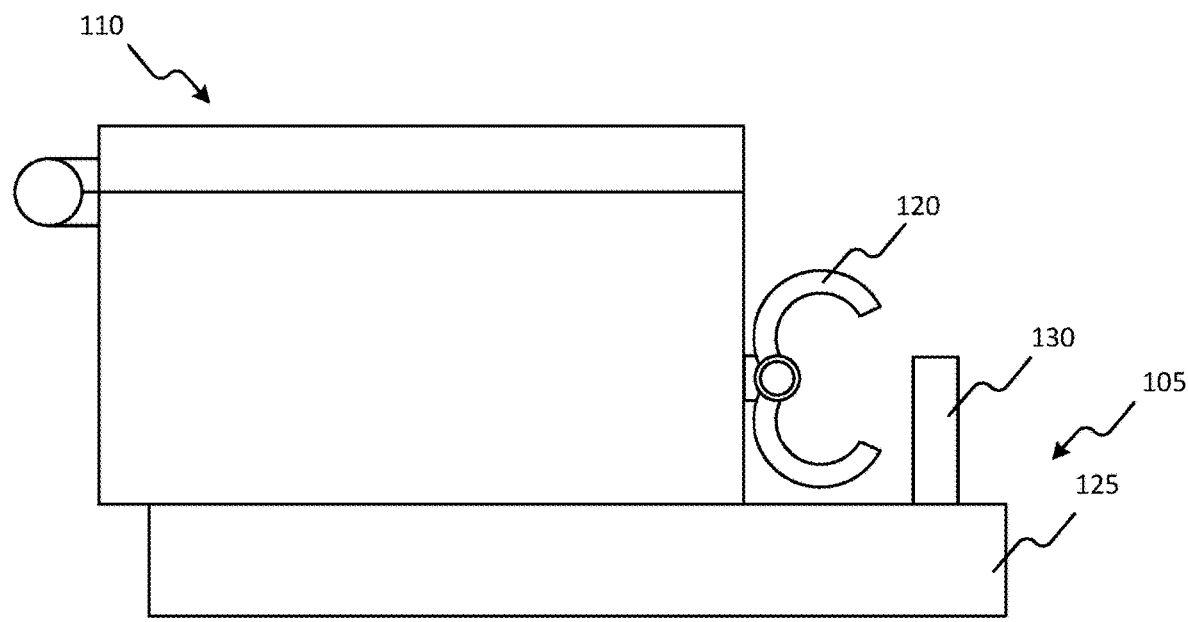
FIG. 10 is a side view of an actuator that is not properly aligned with an attachment structure, in accordance with some embodiments.

In some embodiments, after authenticating the actuator 120, the electronic controller 115 confirms alignment between the actuator 120 and the attachment structure 130 prior to activating the actuator 120. In other words, the electronic controller 115 confirms that the actuator 120 and the attachment structure 130 are positioned relative to each other such that the actuator 120 will attach to the attachment structure 130 upon being actuating. For example, the actuator 120 illustrated in FIG. 9 is properly aligned with the attachment structure 130 such that the actuator 120 will properly attach to the attachment structure 130 the when the actuator 120 changes from the open state (illustrated in FIG. 9) to the closed state. As a further example, the actuator 120 illustrated in FIG. 10 is not properly aligned with the attachment structure 130. Consequently, the actuator 120 illustrated in FIG. 10 will not attach to the attachment structure 130 when the actuator 120 changes from the open state (illustrated in FIG. 10) to the closed state. This may be useful, for example, during handoff and autonomous delivery of package containers.

Figure 11:
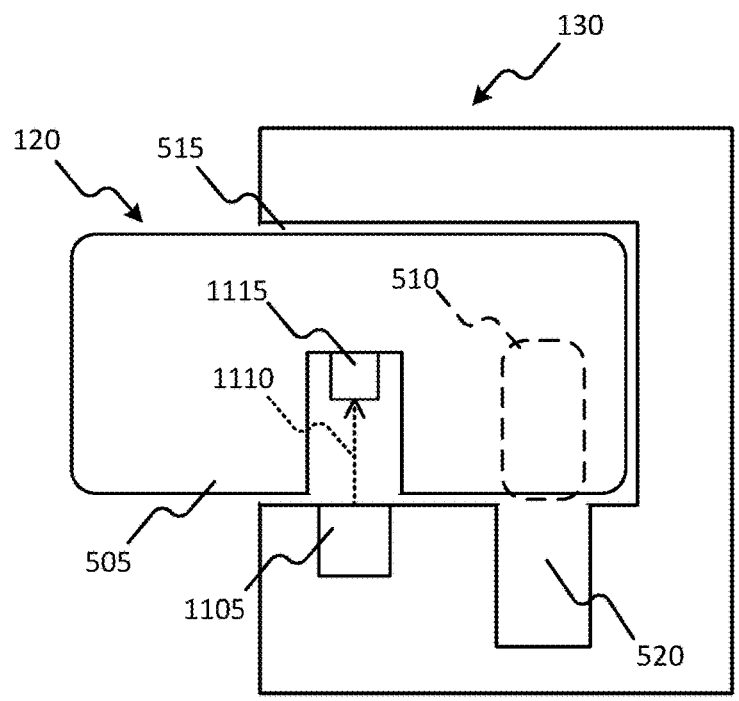
FIG. 11 is a partial sectional view of using optical signals to detect proper alignment between an actuator and an attachment structure, in accordance with some embodiments.

In some embodiments, the electronic controller 115 confirms alignment between the actuator 120 and the attachment structure 130 using optical signals. For example, the attachment structure 130 illustrated in FIG. 11 includes an optical transmitter 1105 that transmits an optical signal 1110 into the sleeve 515. The actuator 120 illustrated in FIG. 11 includes an optical receiver 1115. The optical receiver 1115 detects the optical signal 1110 transmitted by the optical transmitter 1105 when the body 505 of the actuator 120 is properly aligned within the sleeve 515 of the attachment structure 130. Thus, the electronic controller 115 can confirm alignment between the actuator 120 and the attachment structure 130 by ensuring that the optical receiver 1115 detects the optical signal 1110 transmitted by the optical transmitter 1105.

Figure 12:
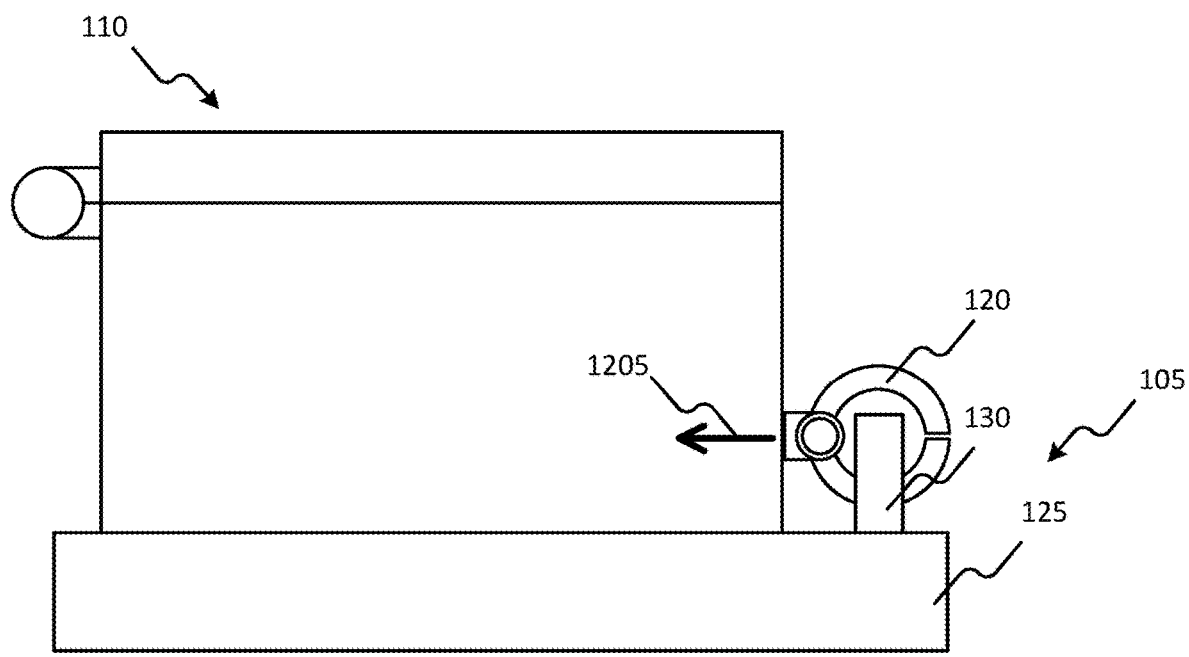
FIG. 12 is a side view of a tug test performed between an actuator and an attachment structure, in accordance with some embodiments.

In some embodiments, after activating the actuator 120 to attach itself to the attachment structure 130, the electronic controller 115 confirms attachment of the actuator 120 to the attachment structure 130 prior to transmitting the attachment status of the transport container 110. In some embodiments, the electronic controller 115 confirms attachment of the actuator 120 to the attachment structure 130 via a tug test. A tug test includes a physical pulling force being exerted on the actuator 120 after it is attached to the attachment structure 130. For example, as illustrated in FIG. 12, the transport container 110 is tugged (or pulled) in the direction of arrow 1205 to confirm that the actuator 120 of the transport container 110 is secured to the attachment structure 130 of the attachment point 105.

In some embodiments, the tug test is performed by an autonomous delivery robot (or a delivery vehicle) (not shown). In such embodiments, the electronic controller 115 transmits a signal (for example, via the transceiver 715) to the autonomous delivery robot after attempting to attach the transport container 110 to the attachment point 105 via the actuator 120 and the attachment structure 130. Responsive to receiving the signal, the autonomous delivery robot tugs on the transport container 110. For example, the autonomous delivery robot pulls the transport container 110 in the direction of arrow 1205 to confirm that the actuator 120 of the transport container 110 is securely attached to the attachment structure 130 of the attachment point 105, as illustrated in FIG. 12. Alternatively or in addition, the transport container 110 performs the tug test. In such embodiments, the transport container 110 further includes electronic actuators (not shown) that pull the actuator 120 toward the body of the transport container 110. Alternatively or in addition, the attachment point 105 performs the tug test.

In some embodiments, the electronic controller 115 measures a movement of the transport container 110 (for example, via movement sensors) caused by the tugging and confirms that the actuator 120 is securely attached to the attachment structure 130 based on the detected movement. For example, the electronic controller 115 confirms a locking acknowledgement when the detected movement is less than a threshold. In other embodiments, movement of the transport container 110 is detected by an external electronic device (for example, by the autonomous delivery robot) and the electronic controller 115 receives a signal from the external electronic device to confirm a locking acknowledgement.

Thus, in some embodiments, the present disclosure provides a combination of a secure package container and attachment point to protect the package at a delivery destination and at various points during transit. In some embodiments, the package can be shipped within a secure container and, at the point of delivery, secured to an anchored attachment point. In some embodiments, the package can be shipped using an unsecure medium (e.g., cardboard box, plastic or paper envelope/bag, etc.) and can be placed into a secure container at a delivery destination. The secure container may be a hardened box, a hardened envelope/bag, or some other hardened restraint.

Certain systems to secure packages may involve time-consuming manual steps, for example to open a locker, scan a package, or other perform other tasks to complete delivery. In contrast, the present disclosure may enable rapid secured delivery of packages. In some embodiments, self-identification features may be included. For example, wireless identification (e.g., RFID, NFC, Bluetooth container tags, etc.), visual identification (e.g., scannable barcode/label), and or inferred identification (date/time, size, weight, etc.) may be used. In some embodiments, self-locking features may be available, such as an ability to lock without first unlocking, an ability to lock without having to perform authentication, an ability to lock without a key or a smartphone (or other device), etc. In some embodiments, automatic confirmation of notification of delivery may be provided. For example, a smart attachment point interface or a smart package may sense a locked condition and may enable communicating confirmation of delivery.

It is to be understood that multiple packages may be secured, for examples using a bar, loop, or grid configuration. In some embodiments, the transport containers 110 are physically stackable or otherwise arrangeable in a cascading configuration, and attachment points can be arranged to match the transport containers. In some embodiments, an attachment point expander can connect to one or more attachment points and provide additional attachment points for additional transport containers.

Package delivery systems may not consistently flag incorrectly delivered packages, including potentially malicious packages. In some embodiments, questionable containers are flagged upon delivery. For example, a timestamp generated from an anchor point can be checked against planned deliveries to determine if a delivery was expected. In some embodiments, containers that do not appear to be "correct" can be flagged. For example, an ability to sense a container identifier (ID) may be used. Visual or wireless exchange of data may occur between a container and an attachment point. Attachment points may be equipped with a visual scanner (e.g., a camera) and/or wireless communication capability, which may be used to verify that the correct container has been delivered and communicate the result to another device or user. An attachment point may communicate its location data to the transport container, which may validate whether a correct delivery location has been reached before enabling attachment. In some embodiments, a container may use a known collection of local delivery data communications identifies (e.g., Wi-Fi or Bluetooth beacons/messages) to triangulate and validate a delivery location. In some embodiments, multiple validations methods may be used. In some embodiments, the "correctness" of a package can be inferred, at least in part, based on a size, dimensions, weight, and/or other physical characteristics of the package.

It may be expensive to install anchor points to secure containers, and property owners may not want new hardware installed at their property. In some embodiments, attachment points may utilize existing structures, such as door knobs, light poles, telephone poles, mailbox poles, etc. A cable with a lock may be used to secure containers, where the cable includes a smart locking mechanism. A smart lock may include two cable locks—one to attach to an existing structure and the other to secure a container. A smart lock may include electronics to control and monitor the locks. In some embodiments, existing structures can be leveraged to create installation free anchor points. For example, an anchor point may be secured by closing a front door or a garage door, because an existing latch/closure may be used to secure the cable or other anchor point. In some embodiments, a passive anchor point can be installed by a homeowner and can have limited footprint to reduce impact on home aesthetics. For example, a hook or eyelet can be installed on walls, floors, ground, or other fixed structures. A hole or depression can be created to anchor a container. A passive anchor point connector can be used by an active attachment point. A top-grooved, horizontal rail can be used, and a corresponding smart package may engage the groove of the top rail and then lock to either a groove on the bottom or become mechanically anchored. A vertical rail with a series of attachment holes can be used. A bar or rail housing one or more cables that connect to smart packages may also be used.

Some containers may be left at an anchor point for an extended amount of time and will require additional services (besides secure attachment) to keep electronics functioning and or maintaining the environmental requirements of the contents of the container (for example, if the contents include perishable food items). In some embodiments, an attachment anchor point interface may be integrated with an electrical power supply, a wired communication network, chilled/heated water/air, compressed air, wireless battery charging, etc. The process of attaching a package container may be designed to also connect such additional services provided by the anchor point to the package container. An ability to monitor and report status/condition of both the contents of the package container and of the system itself may be provided.

In some embodiments, various dimensional configuration of attachment or anchor connection points may be implemented. Point-based configurations may include single or multiple smart attachment points or anchors. Line-based configuration may include horizontal bars or vertical rails. Surface-based configurations may include a mesh or a hole grid surface as part of a wall or table. Attachment points can be part of smart package, mounted to a physical structure, connected to variations of attachment/anchor point replicators or extenders (which enable expansion of the number of secure connection points to support more packages), at the end of a cable (where it may be connected to a smart package or to a static interface of a physical anchoring structure), etc.

The embodiments of the present disclosure are designed to support a range many levels of security, from a minimum-security level to ultra-high level of security. Higher levels of security may be enabled by employing methods such as the use of higher strength materials, the amount and types of electronic sensing, communications systems for monitoring and reporting, and advance authentication methods to verify the delivery resources and recipients. The attachment point-based delivery system may support the secure transfer transition of the parcels along each stage of their journey. This may be a design component for the attachment point system. This includes the origin of the parcel, any higher-level racking system, the delivery vehicle(s), any mechanical systems/robotics transferring the parcel or the higher-level parcel racking system or the final destination attachment point. Having more than one attachment point available on a parcel enables the parcel to always be physically anchored to at least one attachment point during transfer transitions from one actor to the next.

In various embodiments, attachment methods for an attachment point may include: through an opening and expanding so that it cannot be pulled back through the opening, into an opening but only so far that a locking mechanism protrudes out the far side (which can be tight or loose), automatically screwing into the opening and locking into place (where rotation by a human or robotic delivery resource is not required, a smaller protrusion (e.g., triangular in shape) being pushed into a larger opening and then twisting to lock, etc. Packages attached to a wall can be quickly located based upon the packaging providing audio or visual response signaling to location inquiries by a recipient. The inquiries technique may include a wireless device communicating to the smart package, face or voice recognition of the recipient by the smart package, etc.

Figure 13:
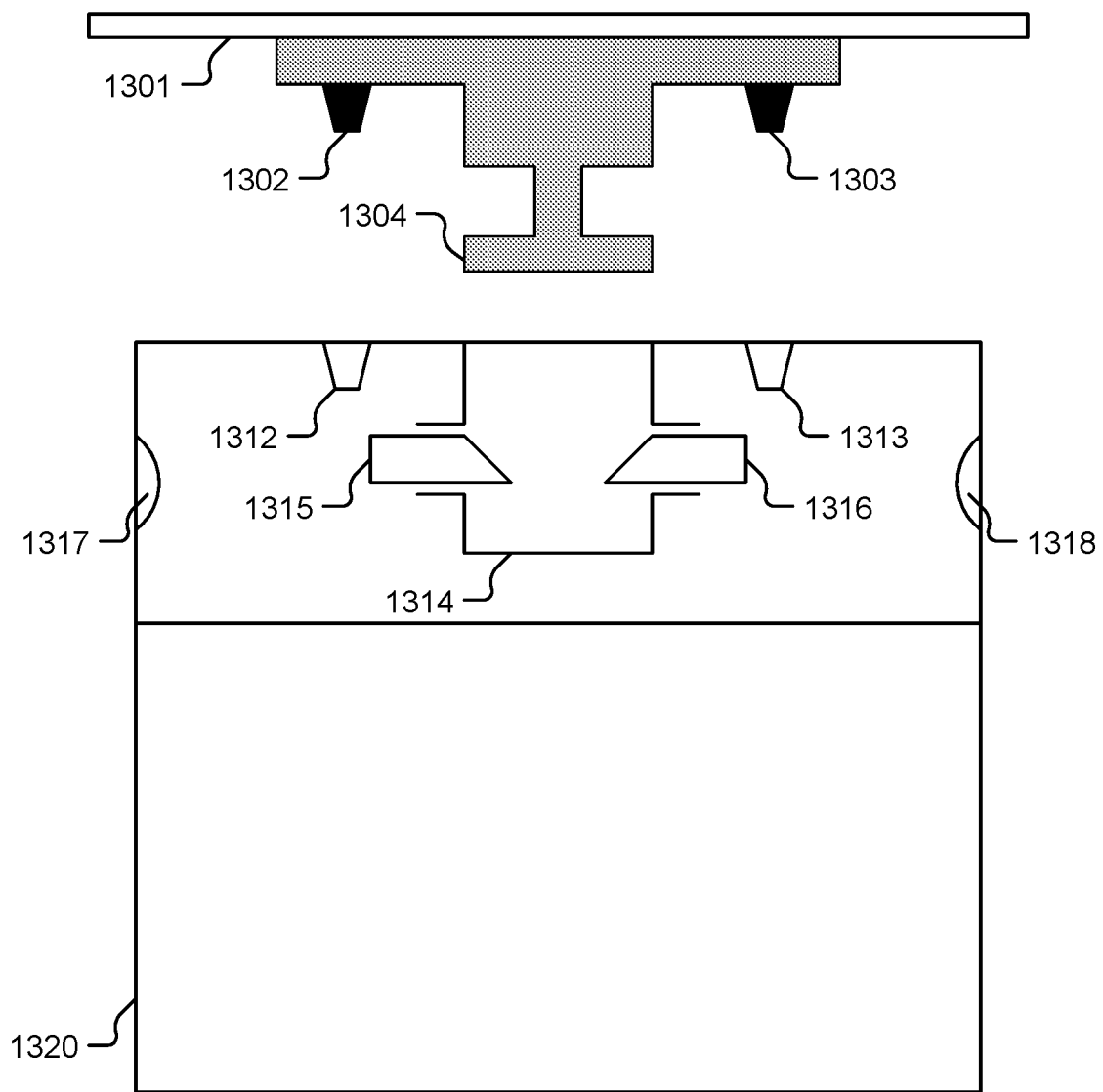
FIGS. 13, 14, 15, 16, 17, 18, 19, 20, 21, and 22 illustrate examples of attachment points, in accordance with some embodiments.
Figure 14:
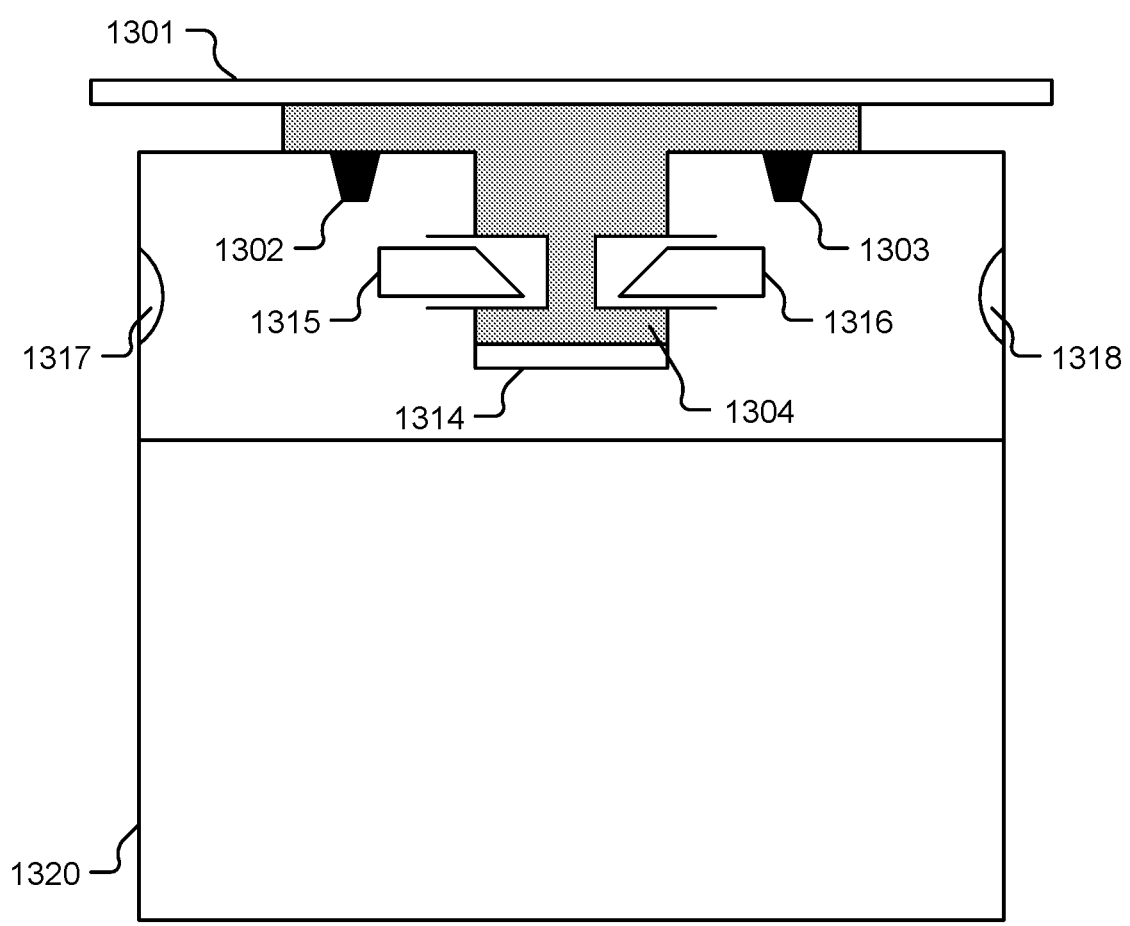

FIGS. 13 and 14 illustrate top view of an attachment mechanism to secure a smart package 1320 to a wall 1301. A wall plate mounted on the wall includes connectors 1302, 1303, and 1304. The smart package 1320 has corresponding recesses 1312, 1313, and 1314. When the smart package 1320 is secured the connectors 1302 and 1303 are inserted into the recesses 1312 and 1313, respectively. The connector 1304 slides past (e.g., spring-loaded) latches 1315, 1316 and into the recess 1314. The latches 1315, 1316 are sloped so that the connector 1304 is difficult to remove from the recess 1314 unless a release (not shown) is activated manually and/or electronically. In some embodiments, attachment interfaces 1317, 1318 are included for mechanical gripping of the smart package 1320, such as by robotic devices.

Figure 15:
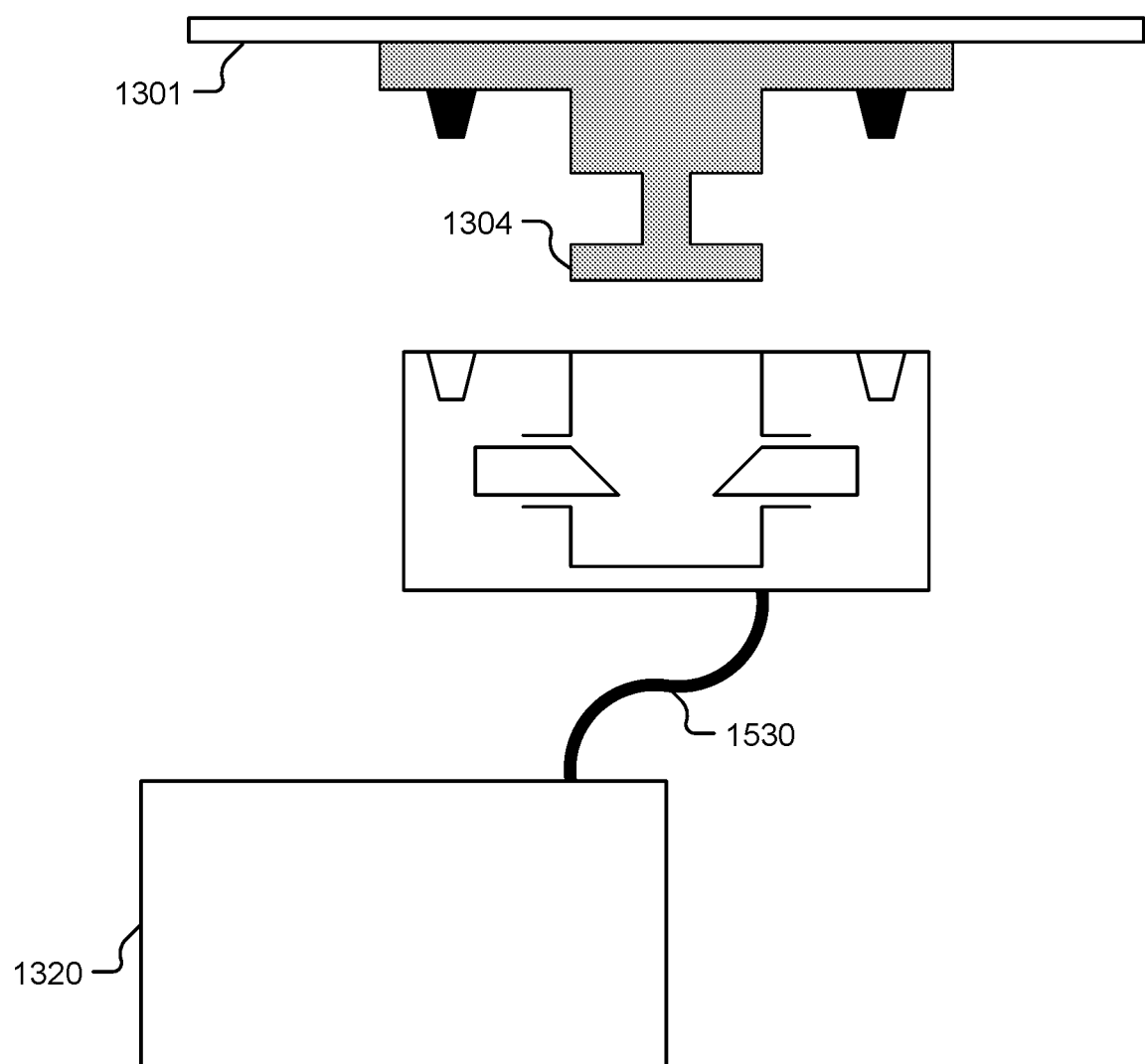
Figure 16:
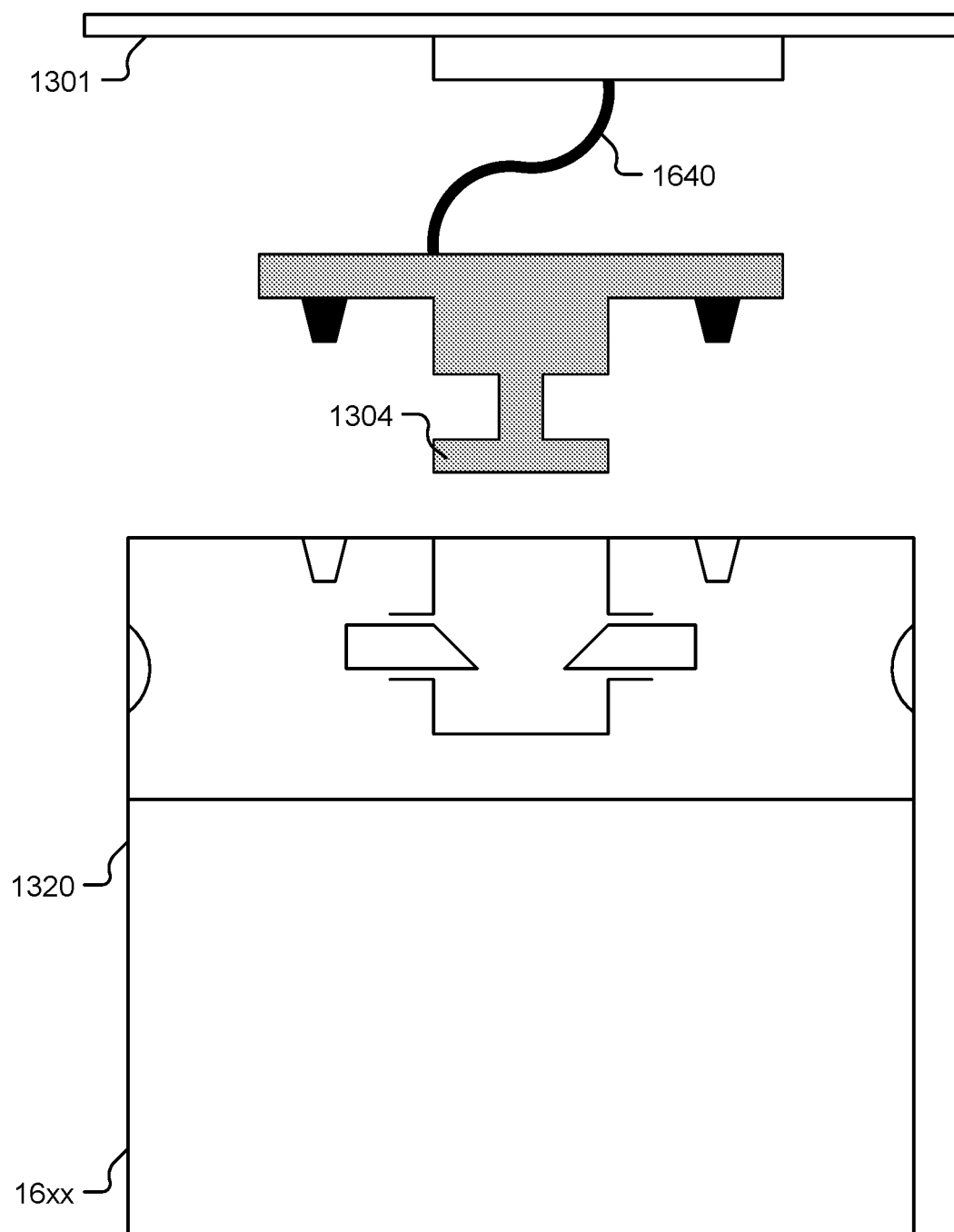

FIG. 15 illustrates a variation of the attachment mechanism of FIGS. 13-14 in which the smart package 1320 has retractable cable 1530 with the intelligent attachment point interface that is couplable to the wall plate of the wall 1301. In some examples, the cable 1530 includes wiring for communications and/or power. To illustrate, power wiring may be used to charge components of the smart package 1320 via electrical connections to wiring/pins that are part of the connector 1304. FIG. 16 illustrates a variation of the attachment mechanism of FIG. 15 in which the wall plate has a retractable cable 1640 but the smart package 1320 does not have a retractable cable.

Figure 17:
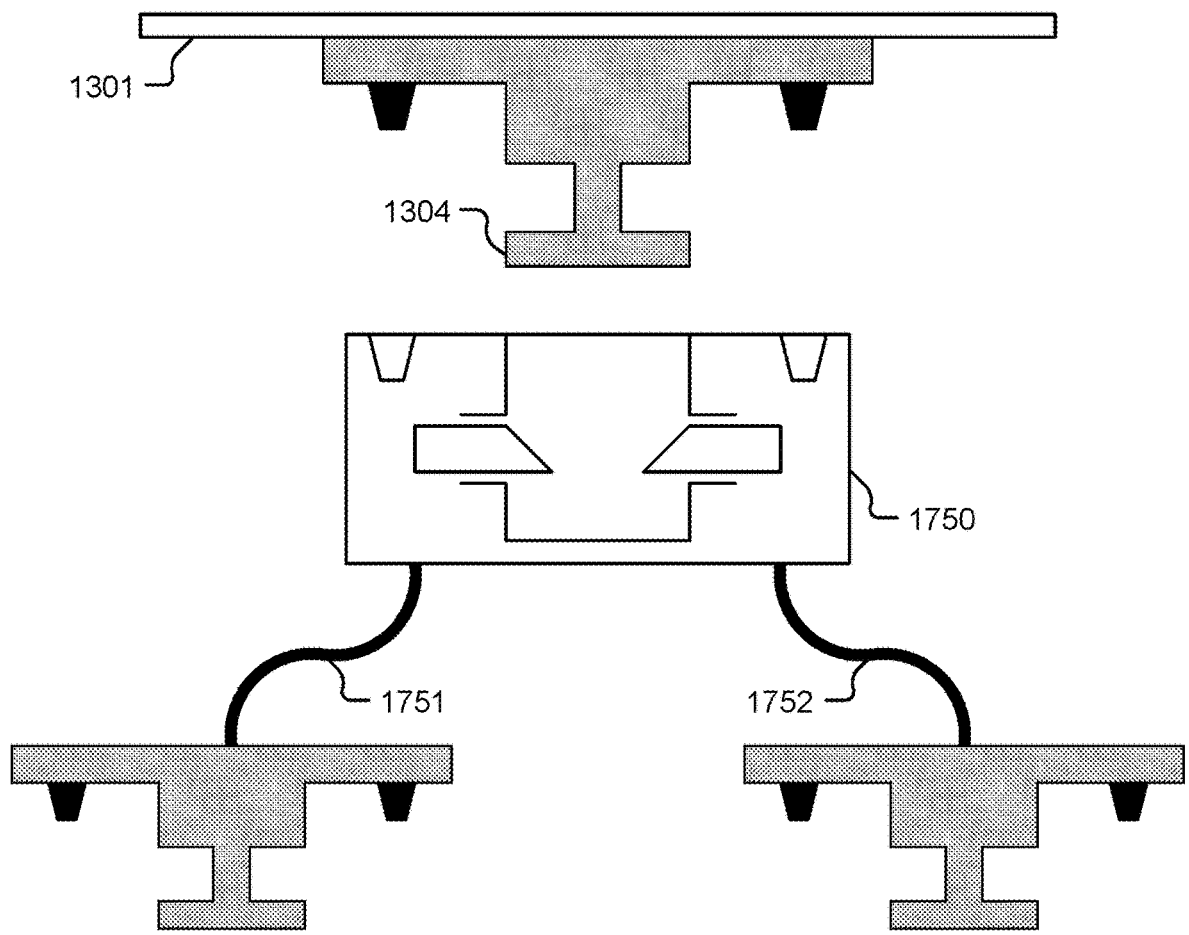

FIG. 17 illustrates an attachment point expander 1750 that can be connected to the connector 1304 of the wall plate. The expander includes two cables (or other tethers) 1751, 1752, each of which includes a couplable connector. The expander 1750 may thus expand a single wall plate attachment point to two connection points (i.e., a one-to-two expander). Though two cables are shown, it is to be understood that any number of cables may be present in other embodiments. Moreover, although a cable-based expander is used, it is to be understood that this is not to be considered limiting. For example, in an alternate embodiment, multiple attachment points may be formed on or otherwise disposed on a surface of a wall plate rather than in a cable-based configuration.

Figure 18:
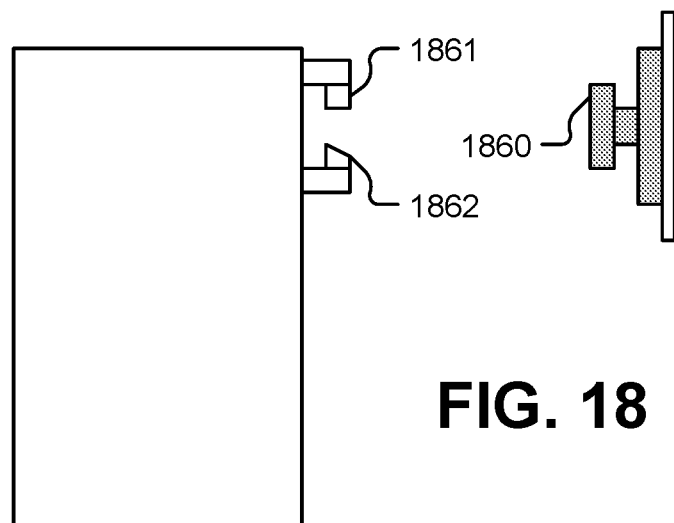
Figure 19:
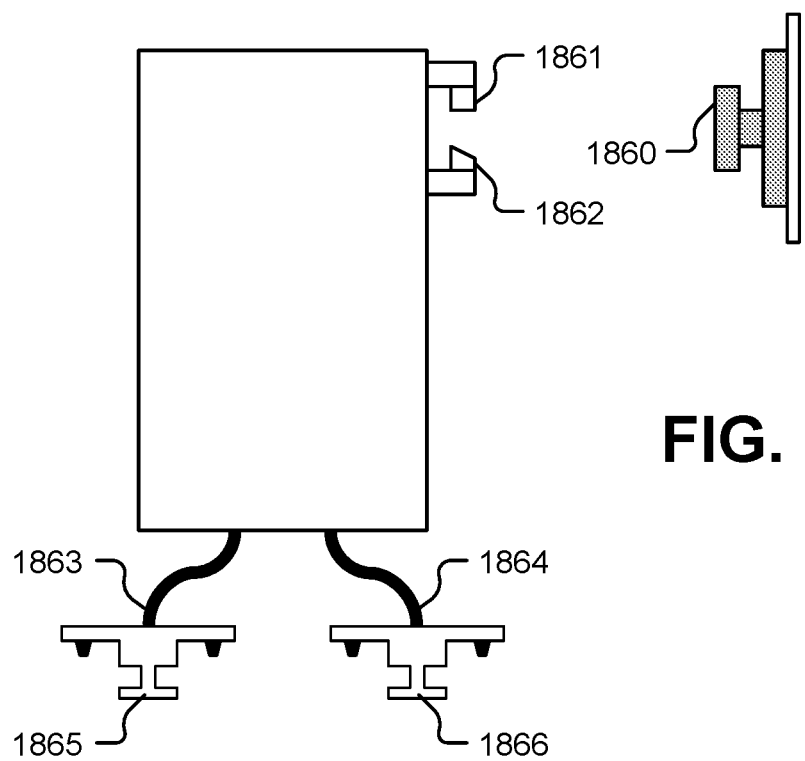

FIG. 18 illustrates a side view of an attachment mechanism in which a rail/bar can be anchored to a physical structure. A connector 1860 of the rail/bar (which may be mounted to a wall) can be secured by latches 1861, 1862 (which may be part of a smart package). In the illustrate embodiment, the latch 1862 is sloped to make securing package to the rail/bar easier. Multiple smart packages can be secured side-by-side onto a single, long rail/bar. FIG. 19 illustrates a variation of the attachment mechanism of FIG. 18 including both a rail/bar interface and cable adapters 1863, 1864. Connectors 1865, 1866 attached to the cable adapters may be used to attach additional smart packages or may serve as additional (or alternative) attachment mechanisms for the same package as the one whose latches 1861, 1862 attach to the connector 1860 of the rail/bar.

Figure 20:
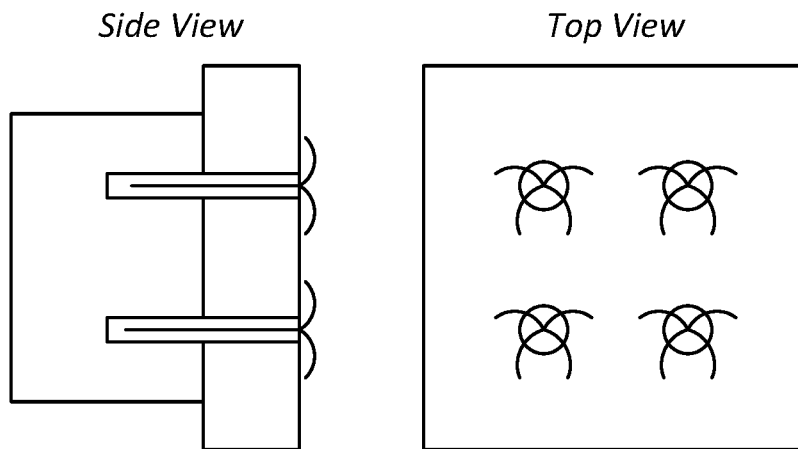
Figure 21:
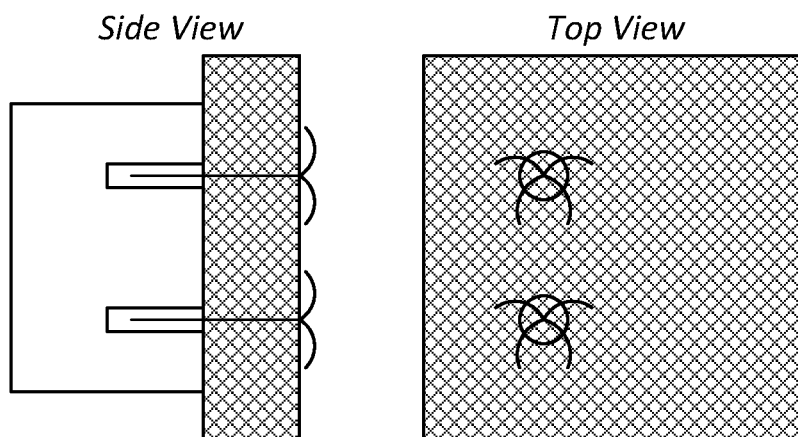
Figure 22:
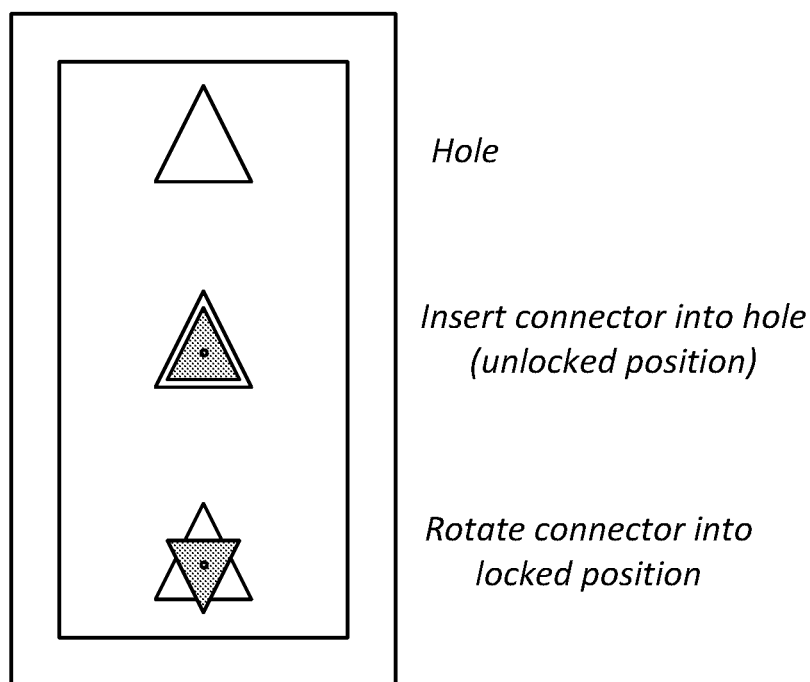

FIG. 20 illustrates a side view and a top view of example of an attachment point mechanism in which a plate with tethered hooks can be passed through a plate with holes to secure a package to a wall or table. FIG. 21 illustrates a variation of the attachment mechanism of FIG. 20 where a mesh fabric or surface is used instead of a plate with holes. FIG. 22 illustrates an example of a locking system in which a connector can be inserted into a similarly shaped but larger hole and then rotated into a locking position. Although a triangle-shaped connector and hole are shown, it is to be understood that other shapes may be used instead.

Secure attachment points are available for use in the higher levels of racking tiers. This allows groups of parcel items to be securely stored or transported as a group within a higher-level packaging tier or holding vessel. This facilitates logistics optimization such as rapid loading/unloading of vehicles and the organization of parcels.

This disclosure is not limited in its application to the examples provided, the embodiments discussed, or to the details of construction and the arrangement of components set forth in the foregoing description or drawings. The disclosure is capable of other embodiments and of being practiced or of being carried out in various ways.

What is claimed is:

1. A transport container comprising:
a body;
a first securing mechanism coupled to the body, the first securing mechanism configured to couple the body to a second securing mechanism of an attachment point; and
a controller configured to:
receive a request for coupling; and
responsive to receiving the request for coupling, initiate coupling between the first securing mechanism and the second securing mechanism, wherein the coupling comprises locking a first clamp of the first securing mechanism to a first attachment structure of the second securing mechanism and locking a second clamp of the second securing mechanism to a second attachment structure of the first securing mechanism.

2. The transport container of claim 1, further comprising an actuator configured to manipulate the first securing mechanism responsive to the controller initiating coupling between the first securing mechanism and the second securing mechanism.

3. The transport container of claim 2, wherein the actuator is configured to lock the second clamp to the second attachment structure.

4. The transport container of claim 2, wherein the first securing mechanism comprises a threaded fastener, and wherein the actuator is configured to rotate the threaded fastener into a threaded sleeve of the attachment point.

5. The transport container of claim 2, wherein the first securing mechanism comprises a piston, and wherein the actuator is configured to insert the piston into a recess defined in the attachment point.

6. The transport container of claim 2, wherein the first securing mechanism comprises an electromagnet, wherein the actuator is configured to cause the electromagnet to generate an electromagnetic field, and wherein the electromagnetic field is configured to magnetically couple the transport container to the attachment point.

7. The transport container of claim 1, further comprising an optical receiver configured to receive an optical signal from an optical transmitter associated with the attachment point, and wherein the controller is further configured to initiate coupling between the first securing mechanism and the second securing mechanism responsive to receiving the request and responsive to the optical receiver receiving the optical signal.

8. The transport container of claim 1, wherein the controller includes a receiver configured to receive the request for coupling.

9. The transport container of claim 1, further comprising a locking mechanism configured to restrict opening of a lid while in a locked state, wherein the controller is configured to initiate movement of the locking mechanism between the locked state and an unlocked state.

10. A method comprising:
receiving a request for coupling at a controller associated with a transport container; and
responsive to receiving the request for coupling, initiating, by the controller, coupling between a first securing mechanism associated with the transport container and a second securing mechanism associated with an attachment point, wherein the coupling comprises locking a first clamp of the first securing mechanism to a first attachment structure of the second securing mechanism and locking a second clamp of the second securing mechanism to a second attachment structure of the first securing mechanism.

11. The method of claim 10, further comprising authenticating the request for coupling responsive to receiving the request for coupling, wherein the coupling is initiated responsive to the request being authenticated.

12. The method of claim 11, wherein the request is authenticated responsive to a location of the attachment point corresponding to a destination of the transport container.

13. The method of claim 11, further comprising receiving an identification signal associated with the attachment point, and wherein the request is authenticated responsive to the identification signal matching a particular identification signal associated with a destination of the transport container.

14. The method of claim 10, further comprising, responsive to the first securing mechanism coupling to the second securing mechanism, transmitting a status signal indicating that the first securing mechanism successfully coupled to the second securing mechanism from the controller to a device, the device associated with a recipient of the transport container, a sender of the transport container, an owner of the transport container, an owner of the attachment point, or a combination thereof.

15. The method of claim 10, further comprising, responsive to the first securing mechanism failing to couple to the second securing mechanism, transmitting a status signal indicating that the first securing mechanism failed to couple to the second securing mechanism from the controller to a device, the device associated with a recipient of the transport container, a sender of the transport container, an owner of the transport container, an owner of the attachment point, or a combination thereof.

16. The method of claim 10, wherein initiating coupling between the first securing mechanism and the second securing mechanism comprises activating an actuator.

17. A system comprising:
a transport container including:
a body;
a lid pivotally coupled to the body;
a first securing mechanism; and
a controller; and
an attachment point including a second securing mechanism configured to couple with the first securing mechanism,
wherein the controller is configured to initiate coupling between the first securing mechanism and the second securing mechanism responsive to receiving a request for coupling, and wherein the coupling comprises locking a first clamp of the second securing mechanism to a first attachment structure of the first securing mechanism and locking a second clamp of the first securing mechanism to a second attachment structure of the second securing mechanism.

18. The system of claim 17, wherein the transport container comprises a receiver configured to receive the request for coupling.

19. The system of claim 17, wherein the attachment point is associated with a wall plate, a mesh surface, a light pole, a telephone pole, a mailbox pole, a door knob, an entry door, a garage door, or a vehicle.

20. The system of claim 17, wherein the transport container further comprises an actuator configured to manipulate the first securing mechanism responsive to the controller initiating the coupling between the first securing mechanism and the second securing mechanism.

\* \* \* \* \*